United States Patent Office 2,950,498
Patented Aug. 30, 1960

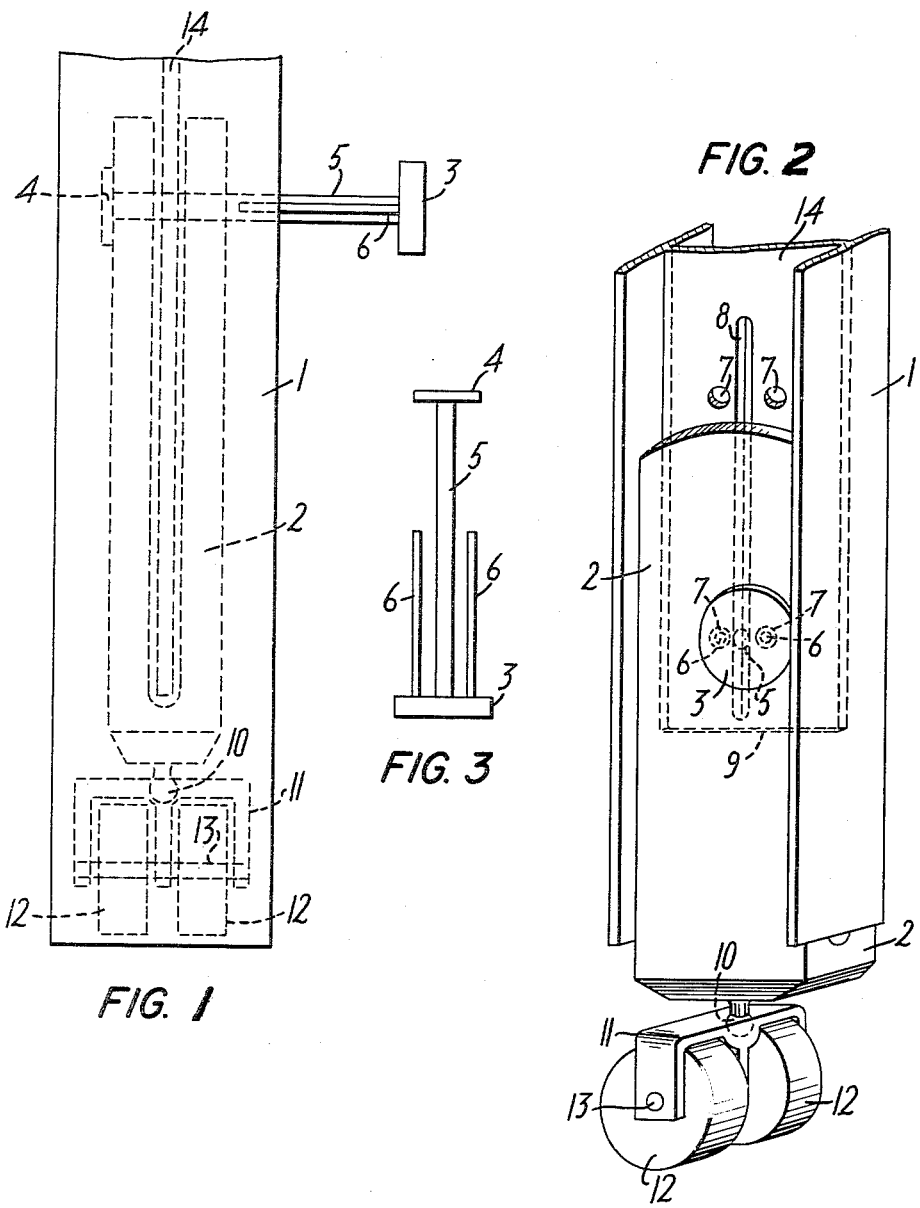

2,950,498

RETRACTABLE CASTER STRUCTURE

Angelo A. Rizzuto, Box 325, General Post Office,
New York, N.Y.

Original application May 27, 1957, Ser. No. 661,644.
Divided and this application Feb. 19, 1959, Ser. No. 794,471

2 Claims. (Cl. 16—33)

This invention relates to caster structures, and this application constitutes a division of a copending application, Serial No. 661,644, filed May 27, 1957.

An object of the present invention is to provide a caster structure which is capable of being retracted from an operative position thereby permitting a vehicle or structure equipped with the invention to remain stationary on solid supports.

Another object is to provide a caster structure which is simple in construction and operation and which is adaptable for general use.

In the accompanying drawing forming a part hereof:

Fig. 1 is a face view of the foot of a structure equipped with the invention showing, by means of dotted lines, the retractable caster structure in a retracted position with its retaining pin fully withdrawn for the purpose of clear illustration.

Fig. 2 is a perspective view of the foot of a structure equipped with the invention showing the retractable caster structure in a fully extended and operative position with its retaining pin in a locking position.

Fig. 3 is a side view of the double-pronged locking or retaining pin illustrating the preferred locking means.

The invention is most conveniently accommodated in a frame of I section as illustrated, and could be commercially produced already incorporated in such a supporting frame representing an attachable foot.

The component parts of the caster structure, in addition to the supporting frame 1 are a U-shaped bar 2 clearly illustrated in Fig. 1, having a ball-shaped lug 10 extending from a tapered base, a double caster 12 mounted in a simple frame 11 having a socket formed in the upper portion for the accommodation of the lug 10 to form a ball-and-socket joint, and a locking or retaining pin 5 having an end piece 4 and a head 3 equipped with prongs 6, which serve as a locking means. The prong 6 is regarded as the simplest form which will serve the purpose. The lug 10 may be forced past a smaller top portion of the socket in the top of the frame 11 or the socket in the top of the frame 11 could be coined about the lug 10 to rotatably secure the frame 11 to the base of the bar 2.

As a means of accommodating the invention, a closed slot 8 and a wide open slot 9 are formed in the web portion 14 of the frame 1. The open slot 9 is indicated by means of dotted lines in Fig. 2. In addition, two pairs of perforations 7 are provided flanking the closed slot 8 at each end thereof.

The bar 2 is fitted into the web 14 and is slidably disposed therein. For the accommodation of the pronged pin 5, the bar 2 is provided with perforations in the upper portion thereof in which the pin 5 and the prongs 6 are slidably disposed, one of the perforations being centrally formed for the pin 5. The perforations in the bar 2 must be in alignment with the slot 8 and the perforations 7 in the web 14 of the frame 1 to permit the pin 5 to be freely slidable within the central perforation in the bar 2 and the slot 8, and to permit the prongs 6 to lock the bar 2 in an operative position or in an inoperative position when the perforations for the prongs in the bar register with the perforations 7 in the web 14. Fig. 2 illustrates the caster structure in an operative position and Fig. 1 the structure in an inoperative position, the pin 5, seen fully withdrawn for clear illustration thereof, normally being in a locking position as illustrated in Fig. 2. The end piece 4 of the pin 5 serves to prevent a disengagement of the pin from the bar 2 and also a disengagement of the bar from the web 14 of the frame 1.

The open slot 9 provides a storage space for the caster 12 when the retractable structure is in an inoperative position within the frame 1 as seen in Fig. 1, thereby permitting the vehicle or structure equipped with the invention to remain stationary on solid supports. This means of rendering a vehicle or structure stationary is clearly safer and more desirable for certain purposes than a caster locking device.

The invention described herein may assume other forms in the construction and arrangement of parts and it should be understood that changes in the form and structural details of the invention may be made without departing from the spirit and scope thereof as hereinafter claimed.

What is claimed is:

1. A retractable caster structure comprising a substantially vertical supporting frame of I section having a web portion and front and rear flanges, a U-shaped bar having a base with a ball-shaped lug extending downward therefrom and integral therewith, a frame having a socket formed in the upper surface thereof, said ball-shaped lug being engageable in said socket to form a ball-and-socket joint, a caster wheel mounted in said frame, said bar being provided with perforations in the upper portion thereof, said perforations extending laterally thru the arms of said bar and being positioned one at the center of said upper portion and one on each side of said central perforation in a spaced relation thereto, and a locking pin having a head and an end piece, said head having a pair of prongs extending inwardly therefrom, said prongs being parallel to said pin and in a spaced apart relation thereto, said pin having a length substantially twice the thickness of the bar and said prongs having a length substantially one half the length of the pin, said supporting frame having a relatively broad open slot formed at the lower end in the web portion thereof and a relatively narrow closed slot centrally and longitudinally positioned in the center of said web portion directly above said open slot and an upper pair of perforations formed at one end of said closed slot and a lower pair of perforations formed at the other end thereof, said perforations being positioned diametrically in spaced relation to said slot, said U-shaped bar being adapted to slidably engage the web portion of the frame at the slotted lower end thereof, said central perforation of the bar registering permanently with the closed slot in the frame and the side-long perforations of the bar registering with the lower pair of perforations in the frame when the bar is in an extended position and with the upper pair of perforations in the frame when said bar is in a retracted position, said locking pin being adapted to slidably engage in the perforations of the bar and the slot and perforations in the frame, the pin proper being permanently slidable within the central perforation of the bar and the slot in the frame, the end piece of the pin preventing a detachment thereof from the bar when the pin is in a fully withdrawn position, and the prongs of the pin being slidably engageable in the side perforations of the bar and the lower perforations in the frame to releasably secure the bar in an extended position and slidably engageable in said side perforations of the bar and the upper perforations in the frame to releasably secure the bar in a retracted position, said frame and said caster wheel being confined within said open slot in the web of the frame when the bar is in said retracted position.

2. A retractable caster structure comprising a substantially vertical supporting frame of I section having a web portion and front and rear flanges, a U-shaped bar having a base and a ball-shaped lug extending downward from said base, a frame with a socket formed in the upper surface of said frame, said ball-shaped lug being engageable in said socket to form a ball-and-socket joint, a caster wheel mounted in said frame, said bar being provided with openings in the upper portion thereof extending thru the arms of said bar, said openings being positioned one at the center of said upper portion and at least one laterally of said central opening in spaced relation thereto, said frame having an open slot formed at the lower end in the web portion thereof and having a closed slot positioned centrally and longitudinally in said web portion above said open slot with at least one upper and lower opening formed at each end of said closed slot adjacent to it, and a locking pin having a head on one end and retaining means on the opposite end thereof, said head being provided with at least one locking prong extending inwardly in spaced relation to said pin, said U-shaped bar being adapted to slidably engage with the web portion of the frame within the open slot, said openings in the bar being adapted to register with the closed slot and at least one adjacent opening in said web portion to permit a slidable relative engagement of said locking pin in said registering openings when the bar is in a predetermined position, said bar being in an operatve position when extended to permit use of said caster wheel and in an inoperative position when retracted, said pin being permanently engageable in the central opening of the bar and said closed slot and being retained permanently engageable therein by said retaining means, each locking prong being alternately engageable in an opening in the bar and said upper and lower openings in the web, said locking pin being adapted to engage the openings in the bar and each lower opening in the web to releasably secure the bar in said operative position and said openings of the bar and each upper opening in the web to releasably secure the bar in said inoperative position, said caster wheel being positioned within said open slot in the frame when the bar is in said inoperative position.

References Cited in the file of this patent

UNITED STATES PATENTS

| | | |
|---|---|---|
| 726,420 | Frazier | Apr. 28, 1903 |
| 1,064,244 | Neugebauer | June 10, 1913 |
| 1,193,051 | Overmyer | Aug. 1, 1916 |
| 1,219,071 | Bodnar | Mar. 13, 1917 |